United States Patent [19]

Meiller et al.

[11] 4,397,501
[45] Aug. 9, 1983

[54] VEHICLE SEAT, MORE SPECIALLY FOR COMMERCIAL VEHICLES

[75] Inventors: Hermann Meiller; Otto Kunst, both of Amberg, Fed. Rep. of Germany

[73] Assignee: Messrs. Willibald Grammer, Amberg, Fed. Rep. of Germany

[21] Appl. No.: 216,839

[22] Filed: Dec. 15, 1980

[30] Foreign Application Priority Data

Jan. 8, 1980 [DE] Fed. Rep. of Germany ....... 3000433

[51] Int. Cl.³ .............................................. A47C 3/00
[52] U.S. Cl. .................................. 297/301; 297/307; 297/338
[58] Field of Search ............... 297/304, 305, 306, 307, 297/338, 301; 248/566, 584, 575, 578, 576; 74/527; 267/175, 177

[56] References Cited

U.S. PATENT DOCUMENTS

| 1,447,511 | 3/1923 | Davis | 74/527 |
| 1,458,688 | 6/1923 | Duxbury | 74/527 |
| 1,767,757 | 6/1930 | Harris | 297/307 |
| 2,891,784 | 6/1959 | Taylor | 267/175 X |
| 3,156,499 | 11/1964 | Freedman | 297/307 |
| 3,550,953 | 12/1970 | Neale | 297/338 X |
| 3,632,167 | 6/1972 | Sinfield | 297/307 |
| 3,774,963 | 11/1973 | Lowe | 297/338 |
| 4,211,426 | 7/1980 | Motloch | 297/307 |

FOREIGN PATENT DOCUMENTS

| 1245766 | 7/1967 | Fed. Rep. of Germany . |
| 2805842 | 8/1979 | Fed. Rep. of Germany ...... 248/566 |
| 831304 | 5/1938 | France ................................ 297/307 |

*Primary Examiner*—James T. McCall
*Attorney, Agent, or Firm*—Staas & Halsey

[57] ABSTRACT

A commerical vehicle seat with a mechanism for adjusting the seat to the weight of the driver, wherein there is provided a support plate for the backrest of the seat capable generally of upright motion relative to a backrest support. Between the backrest support plate and the support backrest there is at least one spring for biasly a seat support bracket, with one end of the spring being able to be moved in relation to the backrest support plate (or the backrest support) by an adjustment member which adjusts to different weights. More specifically, this end of the spring is connected to a support lever which may be rotated about a generally horizontal axis and is fixed to the backrest support, while the other end of the spring is acted upon by an adjustment lever which may be spring-locked in a number of different positions for keeping the support lever in different positions of adjustment. The adjustment lever is also rotatably fixed to the backrest support.

13 Claims, 8 Drawing Figures

VEHICLE SEAT, MORE SPECIALLY FOR COMMERCIAL VEHICLES

BACKGROUND OF THE INVENTION (i) Field of the Invention

The present invention relates to a motor vehicle seat, and more specially a seat for a commercial vehicle. The seat has an adjustment system for taking into account different weights of persons using the seat, wherein a backrest support plate of the seat is guided for generally capable of upright motion on a backrest support and, between the backrest support plate and the support there is at least one spring for supporting the seat portion, the spring being connected at one end to the backrest support plate or the support by way of an adjustment member capable of compensating for the different drivers' weights.

(ii) The Prior Art

In the case of seat adjustments to a driver's weight, a spring is usually put under a greater or lesser strain by turning a screw-threaded rod and thus adjusting the point at which the spring is joined with the support plate or support. The best adjustment to the weight of the driver or other user is produced when, on driving in the vehicle, the driver's seat is adjusted so that the spring is at its middle position of the overall possible motion of the spring; that is to say, on static adjustment of the spring there will be the same amount of spring motion upwards and downwards. It will readily be seen that such weight adjustment only makes sense when the system will actually be used by the driver and if the seat is so designed that the right adjustment may readily be produced. However, repeated, quick and easy use is not observed with the known weight adjustment systems, because on the one hand the screw-threaded rod has to be turned more than once and this, to the driver, seems to be a waste of time so that no such adjustment is undertaken. Furthermore, it is not readily possible for the driver to see if the spring force adjustment has been adjusted to the right value. For this reason, seats have been designed with a pointer or the like to make it clear when the right adjustment has been produced.

Furthermore, in German Auslegeschrift specification No. 1,245,766 a driver's seat has been proposed, more specifically fo tractors, where adjustment of the spring force is undertaken by a simple lever which is spring-locked into certain given positions. A shortcoming of this known seat design is, however, that it is generally complex in its mechanical design and is likely to malfunction. In fact, the teaching of German Pat. No. 1,245,766 limits its use to seats in which the seat support system, at least in some parts, is turned about a single axis. The teaching of German Pat. No. 1,245,766 may not in fact be used for a seat which is only moved in an upright direction over a support.

SUMMARY OF THE INVENTION

One purpose of the present invention is that of designing a motor vehicle seat of the sort noted, that is, a seat only moving in an upright direction, in such a way that, it assures a simple, low cost mechanical design, and a high-speed, exact adjustment to a given weight of driver.

For effecting this purpose, there is provided a seat with a spring connected to the structure at one end of a support lever, which is rotatably fixed to the support or the backrest support plate for moving about a generally horizontal axis. The other end of the support lever is acted upon by an adjustment lever which is able to be spring-locked in a number of positions corresponding to that of the support lever's different positions during movement, the adjustment lever as well being rotatably supported on the same part as the support lever, that is, on the backrest support or the backrest support plate.

In a vehicle seat of the present invention, it will be seen that the adjustment of the spring no longer follows the prior art method of using a screw-threaded rod for changing the position at which the spring is joined with the rest of the structure. In fact, only one support lever is made use of, which, by way of the adjustment lever, may be moved into a number of given positions. This design promotes lower cost manufacturing and repair since a support lever is generally much lower in price than a threaded rod and nut. However, the most important useful effect seen is that the adjustment of the support lever to compensate for the weight of the driver may take place very quickly, that is, using a simple motion of the hand, in the case of the vehicle seat design of the present invention. Because adjustment of the adjustment lever and the support lever takes place in specific steps, the driver, on undertaking adjustment of the seat to compensate for his weight, does not have to give special attention to change the adjustment. The differences between the weight ranges as based on the separate positions or steps of the adjustment lever, are so great that the wrong adjustment will readily be seen.

In one embodiment of the invention producing a specially useful effect, the support lever and the adjustment lever are placed and designed for automatically locking each other into at least two positions, so that there is a saving in the number of parts needed.

As a further embodiment of the invention, the adjustment lever is rotatably supported in generally the same plane as the support lever, for turning about a more specially horizontal lengthways axis, which is normal to the axis of the support lever. In addition, at the end of the adjustment lever nearest the support lever there is a side jumper or locking member, whose free end is used with a thumbpiece. The side jumper or locking member extends from the support lever, generally parallel to its axis of turning, and has a self-locking effect. With such a system, it is possible for the adjustment lever to be designed extending to the side of the seat and, furthermore, the design may be such that the driver, on making adjustment to his weight, will take the step of increasing or decreasing the amount of weight acting on the seat.

An automatic locking of the present invention's parts in the design noted may be simply produced by providing the thumbpiece of the support lever at least one let back member for spring-lockingly taking up the free end of the jumper on the adjustment lever. This let back member or hollow may best be formed by having a curved form of thumbpiece, the radius of the curve being smaller than the radius of turning of the free end of the jumper. Simply by making use of this further embodiment of the invention, it is possible to make certain that the free end of the jumper is not undesirably forced out of the let back member.

A further locking position for the support and adjustment levers may be produced, as a further embodiment of the invention, if the thumbpiece is formed with a bent down member of the support lever so that the free end of the jumper is able to be locked in a position at which the support lever and its thumbpiece are joined together.

The working life of the adjustment system for the vehicle seat may be increased, while operation is made simpler, if at the free end of the jumper a ball is riveted in position, the ball moving along the thumbpiece of the support lever.

If, as is an embodiment of the present invention, the support lever and the adjustment lever are rotatably fixed to the backrest support, the spring will be a tension spring, the adjustment lever forming a stop for the other end of the support lever in its top end position. This system takes up little space and is trouble-free in operation.

It would generally be possible for the seat plate of the seat to be fixed to the backrest. For a high-speed adjustment system for different weights of driver, it is preferable if the seat plate of the vehicle seat has its front edge rotatably joined to the seat frame while its back edge is rotatably joined with a lower edge of the backrest support plate which is able to be moved upwards and downwards, because on making an adjustment for weight, the weight is partly taken from the backrest.

Lastly, it is possible, as a further embodiment of the invention, for the support to take the form of a stiff shell, which is fixed to the seat's frame and is placed round the edge of the backrest at the side and/or the top. This design is more specially possible, because the adjustment system for the weight of the driver has a generally small overall height.

BRIEF DESCRIPTION OF THE DRAWINGS

Further measures, details and useful effects of the invention will be seen from the following account of the preferred embodiments.

DETAILED DESCRIPTION OF THE PREFERRED EMBODIMENTS

Figure 1:
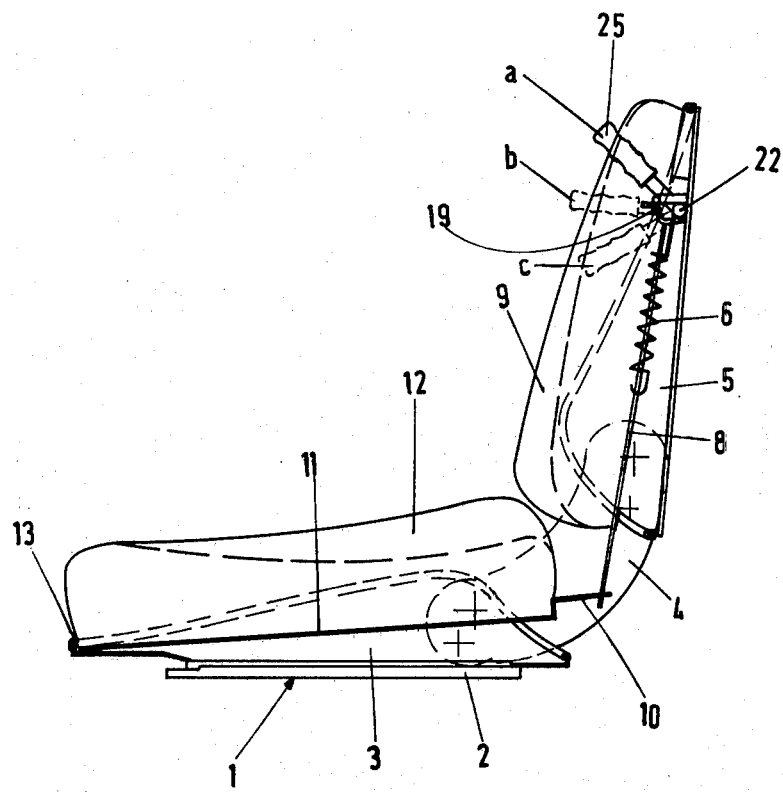
FIG. 1 is a side view of a vehicle seat of the present invention, designed, for example, for a fork lift truck.

Turning now to FIG. 1 it will be seen that the driver's seat of the present invention has a seat frame 1, which is generally only made up of seat rails 2 and a shell 3 whose sides are turned-up. A further support or shell 5 is joined to seat frame 1 by curved legs 4. Shell 5 functions both as a support for the backrest and for fixing one end of a spring 6. The spring 6 is used at the same time for supporting the backrest and, in the present case, for supporting the seat cushion.

Figure 2:
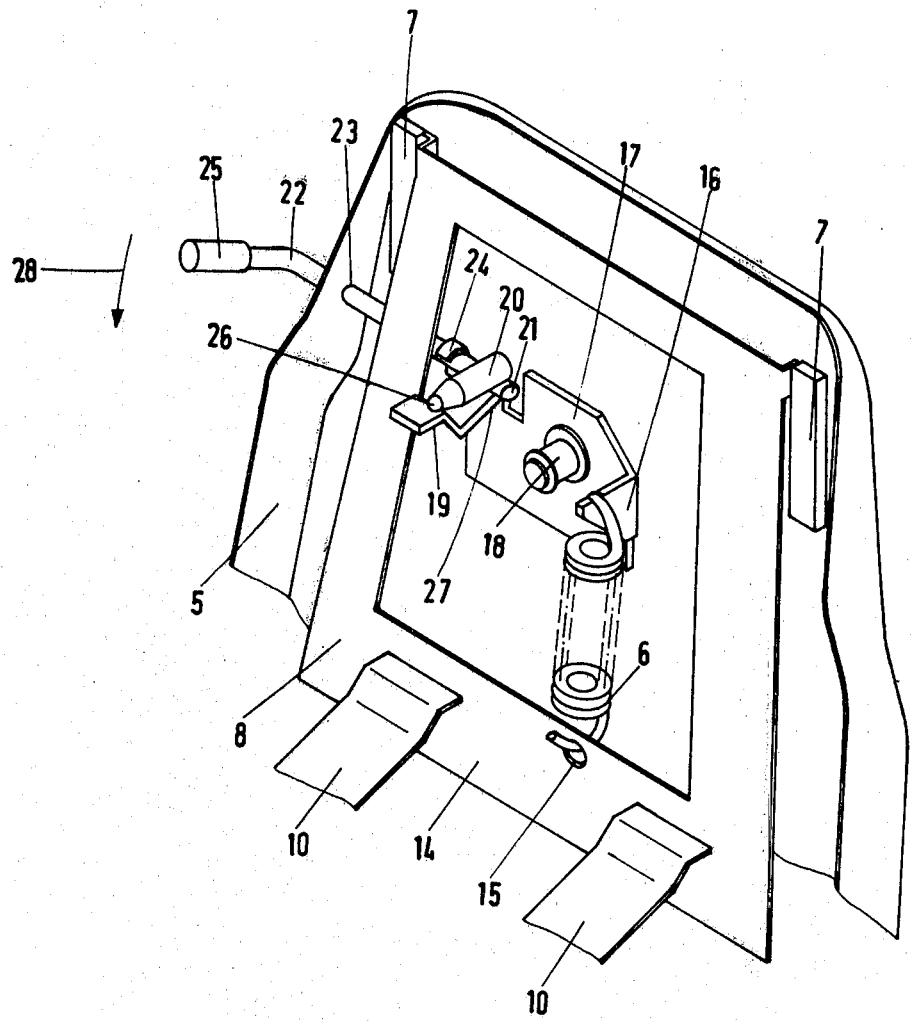
FIG. 2 is a perspective view of the backrest portion of the seat of FIG. 1 after removal of the backrest cushion.

On shell 5 having the function of a support, a support plate 8 is guided by means of guides 7 (see FIG. 2). Cushion 9 of the backrest is fixed to plate 8, which may be moved in a generally upright direction. Near the lower edge of support plate 8 there are cutouts taking up fingers 10 on a support plate 11 for the seat cushion 12 with the outcome that support plate 11 is supported at its back edge on support plate 8 of backrest 9. Front edge 13 of support plate 11 is pivotally fixed to the seat frame 1.

Figure 3A:
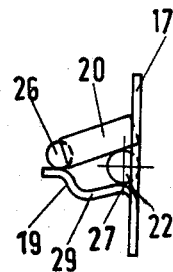
FIGS. 3a to 3c are three diagrammatic plan views looking down on the free end of the adjustment lever in three different positions used for a light-weight, a normal-weight and a heavy-weight driver.
Figure 4A:
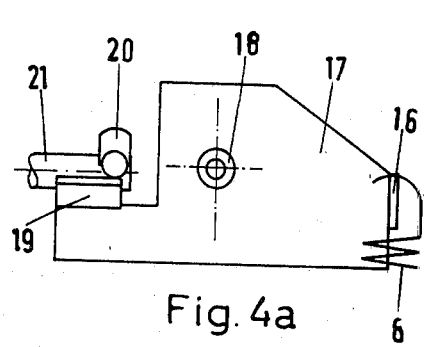
FIGS. 4a to 4c are views of the support lever and of the free end of the adjustment lever in the positions of FIGS. 3a to 3c.

As best seen in FIG. 2, the spring 6 which is used for springingly supporting the backrest support plate 8, and the backrest support 5 in relation to the seat parts 11 and 12, by way of fingers 10, is in the present case a tension spring, whose lower end is slipped into a hole 15 in the crosspiece 14 of support plate 8 of the backrest. The top end of spring 6 is, as may more specifically be seen from FIG. 2, joined up with a corner piece 16 of support lever 17, which is rotatably supported on pin 18 for turning motion about a generally horizontal axis while supported on support 5. While the one arm of support lever 17 has the corner piece 16 used for connection with spring 6, the other arm of the support lever has a thumbpiece 19 which is generally parallel to the axis of turning as formed by pin 18. The design of thumbpiece 19 will be seen clearly from FIGS. 3a to 3c.

A side jumper 20 or locking piece is used with thumbpiece 19 on support lever 17. The jumper 20 is formed on the end 21, of an adjustment lever 22 next to the support lever, which lever 22 may be turned about its generally horizontal lengthways axis. Adjustment lever 22 is slipped through a hole 23 in one turned-up side of shell 5 and at its other end is rotatably supported by way of an eyepiece 24 on support 5. The end of adjustment lever 22 furthest from support lever 17 is bent out at an angle for forming a grip 25.

Lastly, it is to be noted that for minimizing friction and wear between jumper 20 of adjustment lever 22 and thumbpiece 19 of support lever 17, a ball 26 is taken up in a hole at the end of the thumbpiece and kept within it by an inwardly bent lip.

In the present working example as given in the figures, the design of support lever 17 and of adjustment lever 22 is such that adjustment to three different weights of drivers is possible. Grip 25 of adjustment lever 22 may be moved into any one of the three positions marked a, b and c in FIG. 1. Such positions correspond to the positions to be seen in FIGS. 3a to 3c and 4a to 4c.

To adjust for the lightest driver, the seat cushion 12, the support plate 8 and the backrest support 9 have to be in the lowest position; that is, in the position a of grip 25. Adjustment lever 22 and support lever 17 are in the positions to be seen in the FIGS. 3a and 4a and which the thumbpiece 19 has its innermost end 27 resting right against the end 21 of adjustment lever 22, as the reader will clearly be able to see in FIG. 2. Jumper 20, in this case, does not have any effect on thumbpiece 11 of support lever 17.

Figure 3B:
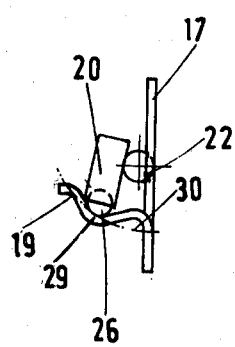
Figure 4B:
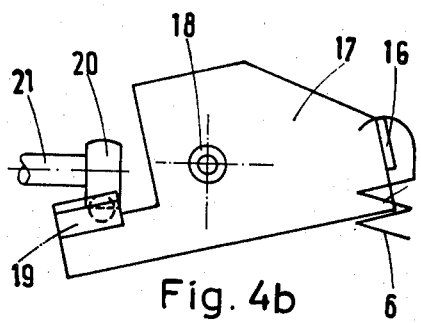

If the adjustment is to be changed because the seat is to be used by a heavier driver, grip 25 is turned in the direction of arrow 28 (see FIG. 2) into position b, in which case the position seen in FIGS. 3b and 4b, of adjustment lever 22 and support lever 17 together with their respective related members will be effected. When this turning motion takes place, ball 26 of jumper 20 will be spring-lockingly moved over the top surface of the thumbpiece until it is locked in the let back area 29 or hollow because the line of motion 30 (marked in chain lines) of the part of ball 26 moving over the top surface of thumbpiece 19 has a radius which is greater than the curve radius of the curved part forming the let back area or hollow 29. In the position of FIGS. 3b and 4b the corner piece 16 is somewhat higher up than in FIGS. 3a and 4a, that is, spring 6 has been stretched somewhat so that it may be used for springingly supporting a heavier driver. The spring 6 is stretched because guides 7 have stops limiting upward motion of support plate 8.

Figure 3C:
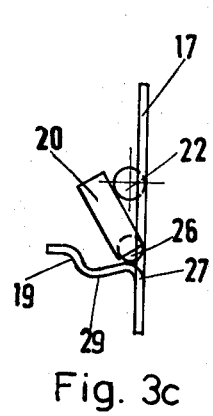
Figure 4C:
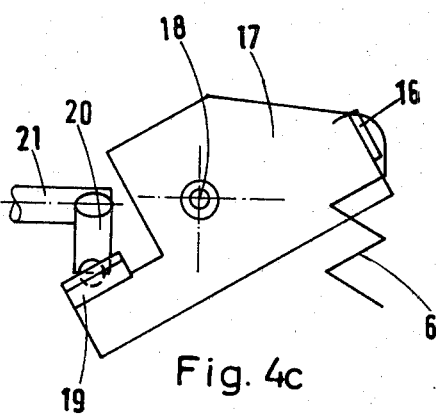

For adjustment to an even heavier driver, grip 25 has to be moved further in the arrowed direction 28 into position c of FIG. 1, in which the parts will have the position to be seen in FIGS. 3c and 4c, and in which case ball 26 of jumper 20 comes to rest at a position near the inner end 27 of thumbpiece 19 as will be seen from FIG. 3c. The limiting stop in this case is the back wall (not figured) of the support or of the shell 5. It will be seen from FIG. 4c that in this position spring 6 is stretched even further, that is, ready for an even heavier driver.

For adjustment of the seat to a lighter driver, it is only necessary for the grip 25 to be moved upwards, this being readily possible, especially, if the driver takes some of his weight from the seat. A driver removing some of his weight will take place almost automatically because the motion of grip 25 is in a direction which is the same motion for decreasing the weight on the seat.

We claim:

1. An adjustable motor vehicle seat having a seat portion and a backrest portion and being adjustable to compensate for differing weights of users, comprising: (a) a backrest support; (b) a backrest support plate connected in sliding relation to said backrest support and being capable of generally upright motion when acted upon by the user's weight, (c) a seat support plate connected substantially perpendicularly to the backrest support plate; (d) spring means for biasly supporting the seat support plate, said spring means being operatively connected between said backrest support and said backrest support plate; and (e) an adjustment means for operatively connecting said backrest support and said backrest support plate and for changing said support position of said spring means in relation to said backrest support and thus for adjustment of the springing properties of such seat portion connected to the backrest support plate, wherein said adjustment means has a support lever rotatably fixed to the seat capable of rotatably turning about a generally horizontal axis, and an adjustment lever designed to be spring-locked in at least two positions in which it keeps said support lever at different angles in relation to the seat to which it is rotatably fixed.

2. A vehicle seat as claimed in claim 1, wherein said adjustment lever and said support lever are capable of locking engagement with each other in different positions.

3. A vehicle seat as claimed in claim 1, wherein said adjustment lever is placed in generally the same plane as the support lever and is rotatable about its lengthways axis, which is generally normal in relation to said axis of said support lever, and wherein the seat further comprises a side jumper on said adjustment lever next to the support lever, and a thumbpiece of said support lever, said thumbpiece being generally parallel to the rotating axis of said support lever, said jumper having a free end designed for locking the thumbpiece with the support lever in different height positions which may be changed by turning said adjustment lever.

4. A vehicle seat as claimed in claim 3, wherein said thumbpiece has at least one let back area for taking up an end of said jumper.

5. A vehicle seat as claimed in claim 4, wherein said let back area of said thumbpiece is formed by said thumbpiece's being curved, the let back area having a radius smaller than the radius of turning motion of the end of said jumper.

6. A vehicle seat as claimed in claim 5, wherein said thumbpiece is formed by bending said support lever such that the free end of said jumper is able to be kept self-lockingly at a position at which said support lever is joined with said thumbpiece.

7. A vehicle seat as claimed in claim 3, having a ball connected to the free end of said jumper.

8. A vehicle seat as claimed in claim 1, wherein (a) said support lever and said adjustment lever are rotatably fixed to said backrest support, (b) said spring is a tension spring, and (c) said adjustment lever takes the form of a stop for the other end of said support lever in an upper position of adjustment.

9. A vehicle seat as claimed in claim 1, further having a seat frame and the seat support plate being pivotally joined at its front edge to said frame, while the back edge of said support plate is pivotally joined with a lower edge of said backrest support plate.

10. A vehicle seat as claimed in claim 9 wherein said backrest support takes the form of a relatively rigid shell having edges bent around the side of the rest of the backrest.

11. A vehicle seat as claimed in claim 10, wherein said shell is bent partially around said backrest support plate at the sides thereof.

12. A vehicle seat as claimed in claim 10, wherein said shell is partially bent around said backrest support plate at the top thereof.

13. A vehicle seat as claimed in claim 3, wherein the adjustment lever is designed to be rotated about a horizontal axis.

* * * * *